US012132437B2

(12) United States Patent
Evans et al.

(10) Patent No.: US 12,132,437 B2
(45) Date of Patent: Oct. 29, 2024

(54) SYSTEMS AND METHODS FOR CONTROLLING A GENERATOR (71) Applicant: ASCO Power Technologies, L.P., Florham Park, NJ (US)

(72) Inventors: Steven E. Evans, Arvada, CO (US); Victor E. Bonachea, Elmwood Park, NJ (US); Mario Ibrahim, Summit, NJ (US); Donald K. Blackman

(73) Assignee: ASCO Power Technologies, L.P., Florham Park, NJ (US)

( * ) Notice: Subject to any disclaimer, the term of this patent is extended or adjusted under 35 U.S.C. 154(b) by 528 days.

(21) Appl. No.: 17/036,040

(22) Filed: Sep. 29, 2020

(65) Prior Publication Data

US 2021/0075350 A1 Mar. 11, 2021

Related U.S. Application Data

(63) Continuation of application No. 16/172,272, filed on Oct. 26, 2018, now Pat. No. 10,840,838.

(60) Provisional application No. 62/578,125, filed on Oct. 27, 2017.

(51) Int. Cl.
*H02P 29/024* (2016.01)
*H02J 9/06* (2006.01)
*H02P 9/08* (2006.01)

(52) U.S. Cl.
CPC .............. *H02P 9/08* (2013.01); *H02J 9/06* (2013.01); *H02J 9/061* (2013.01)

(58) Field of Classification Search
CPC .......... H02P 9/08; H02P 29/024; H02P 9/006; H02J 9/06; H02J 9/061

USPC ......................................................... 318/479
See application file for complete search history.

(56) References Cited

U.S. PATENT DOCUMENTS

| 4,090,090 | A | | 5/1978 | Johnston | |
|---|---|---|---|---|---|
| 4,231,029 | A | | 10/1980 | Johnston | |
| 4,516,076 | A | * | 5/1985 | Pillari | G01R 31/67 324/415 |
| 4,757,416 | A | | 7/1988 | Wilkerson | |
| 5,600,524 | A | * | 2/1997 | Neiger | H02H 3/335 361/45 |
| 5,705,988 | A | * | 1/1998 | McMaster | G08B 29/185 340/630 |
| 5,774,319 | A | * | 6/1998 | Carter | H02H 1/06 361/100 |
| 5,790,430 | A | * | 8/1998 | Steiert | H05K 7/20209 361/695 |
| 7,130,340 | B1 | * | 10/2006 | Jong | H04B 3/46 375/227 |
| 9,304,174 | B1 | * | 4/2016 | Taylor | G01K 17/00 |

(Continued)

*Primary Examiner* — Gabriel Agared
(74) *Attorney, Agent, or Firm* — Locke Lord LLP (57) ABSTRACT

In an example, a control system for controlling a generator and providing an alarm upon detection of a fault condition. The control system includes a control relay, which includes a normally-open (NO) contact pair and a normally-closed (NC) contact pair, between the transfer switch and a controller. The NO contact pair is provided by a NO contact and a common contact, and the NC contact pair is provided by a NC contact and the common contact. The controller can receive signals indicative of a state of the contact pairs of the control relay and, based on the signals, determine whether to activate the generator and/or activate an alarm system.

18 Claims, 7 Drawing Sheets

(56) References Cited

U.S. PATENT DOCUMENTS

| | | | |
|---|---|---|---|
| 10,019,891 B1* | 7/2018 | Bajaj | G08B 17/107 |
| 2006/0022837 A1* | 2/2006 | Takahashi | H02P 29/025 |
| | | | 340/661 |
| 2009/0051557 A1 | 2/2009 | Beatty et al. | |
| 2011/0046808 A1 | 2/2011 | Kellis et al. | |
| 2011/0216453 A1* | 9/2011 | Haines | H02H 9/00 |
| | | | 361/49 |
| 2011/0291621 A1* | 12/2011 | Iles | H01M 10/46 |
| | | | 320/152 |
| 2012/0075759 A1 | 3/2012 | Eaves | |
| 2012/0221161 A1* | 8/2012 | Billingsley | G01R 19/16547 |
| | | | 700/295 |
| 2013/0009483 A1* | 1/2013 | Kawate | H02J 1/10 |
| | | | 307/77 |
| 2013/0151175 A1* | 6/2013 | Streit | G06F 17/00 |
| | | | 702/58 |
| 2013/0258538 A1* | 10/2013 | Billingsley | G01R 19/16576 |
| | | | 361/91.1 |
| 2015/0115743 A1* | 4/2015 | Guse | G01R 21/00 |
| | | | 324/127 |
| 2015/0326043 A1* | 11/2015 | Fink | H02J 7/0047 |
| | | | 320/148 |
| 2016/0178691 A1* | 6/2016 | Simonin | G01R 31/327 |
| | | | 361/42 |
| 2016/0238650 A1* | 8/2016 | Savich | G01R 31/52 |
| 2016/0328946 A1* | 11/2016 | Ma | G08B 21/182 |
| 2016/0343526 A1* | 11/2016 | Schicke, II | H01H 47/002 |
| 2018/0254160 A1 | 9/2018 | Stuckey et al. | |

* cited by examiner

| Relay State # | NO Contact State | NC Contact State | Valid State | Activate Generator | Activate Alarm |
|---|---|---|---|---|---|
| 1 | Closed | Open | Yes | No | No |
| 2 | Open | Closed | Yes | Yes | No |
| 3 | Closed | Closed | No (Open Ckt) | No | Yes |
| 4 | Open | Open | No (Short Ckt) | No | Yes |

Figure 4

| Relay State # | NO Contact State | NC Contact State | Valid State | Activate Generator | Activate Alarm |
|---|---|---|---|---|---|
| 1 | Closed | Open | Yes | Yes | No |
| 2 | Open | Closed | Yes | No | No |
| 3 | Closed | Closed | No (Open Ckt) | No | Yes |
| 4 | Open | Open | No (Short Ckt) | No | Yes |

SYSTEMS AND METHODS FOR CONTROLLING A GENERATOR

CROSS-REFERENCE TO RELATED APPLICATIONS

The present application is a continuation of U.S. patent application Ser. No. 16/172,272, filed on Oct. 26, 2018, which claims priority to U.S. Provisional Patent Application No. 62/578,125, filed on Oct. 27, 2017, and said applications are hereby incorporated by reference in their entirety.

FIELD

The present disclosure generally relates to systems and methods for controlling a generator, and more particularly to control systems and methods for controlling a generator, detecting a fault condition, and providing an alarm when the fault condition is detected.

BACKGROUND

Unless otherwise indicated herein, the materials described in this section are not prior art to the claims in this application and are not admitted to be prior art by inclusion in this section.

Various applications require a nearly constant supply of reliable electrical power to operate effectively. For example, hospitals may require a constant and reliable supply of electricity to ensure medical equipment in operating rooms and the like function when needed. Further, food retailers such as supermarkets and grocery stores may require a constant and reliable supply of electricity to properly operate refrigeration systems associated with display cases and freezers to prevent food spoilage.

While utility companies generally provide electrical power consistently and reliably, such power is sometimes interrupted due to inclement weather, unforeseen accidents, or maintenance. Electrical power consumers seeking to mitigate or avoid even minor interruptions in their power supply often rely on generators and other backup systems to supply electrical power during periods when electrical service from a utility company is interrupted. Transfer switches enable these consumers to switch between a primary electrical source (e.g., from a utility company) and a secondary electrical source (e.g., a generator or other backup system) when one source becomes unreliable or requires maintenance.

Transfer switches may be manual transfer switches where, for example, an operator throws a switch to transfer power from one source to another. Additionally or alternatively, transfer switches may be automatic transfer switches where, for example, the switch automatically senses when a source has lost or gained power and responsively transfers power from one source to another. In one implementation, to transfer power between sources, the transfer switch may initiate a control sequence in which the transfer switch automatically starts a standby generator and then connects the standby generator to the load. The transfer switch may also automatically reconnect the utility power to the load if utility power is reestablished.

SUMMARY

In an example, a system for controlling a generator includes a control relay and a controller. The control relay includes a common contact, a normally-open (NO) contact, and a normally-closed (NC) contact. The common contact is configured to receive power from an electrical power source. The NO contact is in a NO-closed state when coupled to the common contact and an NO-open state when decoupled from the common contact. The NC contact is in a NC-closed state when coupled to the common contact and an NC-open state when decoupled from the common contact. The control relay is configured such that (i) when the control relay is energized by a transfer switch, the NO contact is in the NO-closed state and the NC contact is in the NC-open state, and (ii) when the control relay is de-energized, the NC contact is in the NC-closed state and the NO contact is in the NO-open state.

The controller includes a first input coupled to the NO contact of the control relay, a second input coupled to the NC contact of the control relay, a first output configured to communicate with a generator, and a second output configured to communicate with an alarm system. The controller is configured to (i) receive, at the first input, a first signal indicating whether the NO contact is in the NO-open state or the NO-closed state, (ii) receive, at the second input, a second signal indicating whether the NC contact is in the NC-open state or the NC-closed state, (iii) determine, based on the first signal and the second signal, whether to activate the alarm system, and (iv) determine, based on the first signal and the second signal, whether to activate the generator.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As noted above, to transfer power between power sources, a transfer switch may initiate a control sequence in which the transfer switch automatically starts a standby generator and then connects the standby generator to the load. One approach to performing the control sequence involves closing and opening a contact of a single pole, single throw relay to transmit a control signal to the generator and thereby cause the generator to start.

Figure 1:
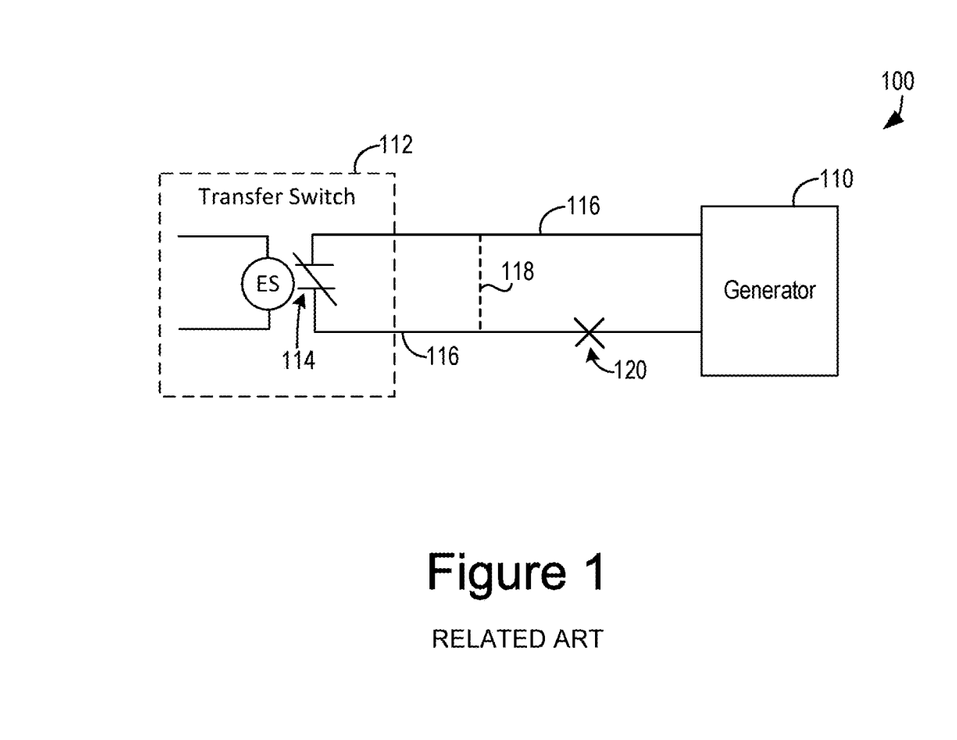
FIG. 1 illustrates a simplified block diagram of a control system according to an example embodiment.

As an example, FIG. 1 depicts a block diagram of a control system 100 for starting a generator 110. As shown in FIG. 1, the control system 100 includes a transfer switch 112, a control relay 114, and the generator 110. The transfer switch 112 is operatively coupled to the control relay 114, and the control relay 114 is coupled to the generator 110 by a plurality of conductors 116. In this arrangement, the transfer switch 112 can actuate the control relay 114 to open or close a circuit of the control relay 114 and thereby provide the start signal to the generator 110. Upon receiving the start signal, the generator 110 starts up and begins generating power.

In some implementations, the conductors 116 can extend for a relatively long distance in a conduit between the control relay 114 and the generator 110. A problem with the type of control system 100 shown in FIG. 1 is that when the integrity of the conductors 116 is compromised, the control system 100 may not be able to properly signal the generator 110. For example, if the conduit is cut and the conductors 116 are shorted to each other, the generator 110 may receive a signal and start even though the transfer switch 112 did not actuate the control relay 114. An example short circuit condition is in shown in FIG. 1 by a dashed line 118.

Figure 2:
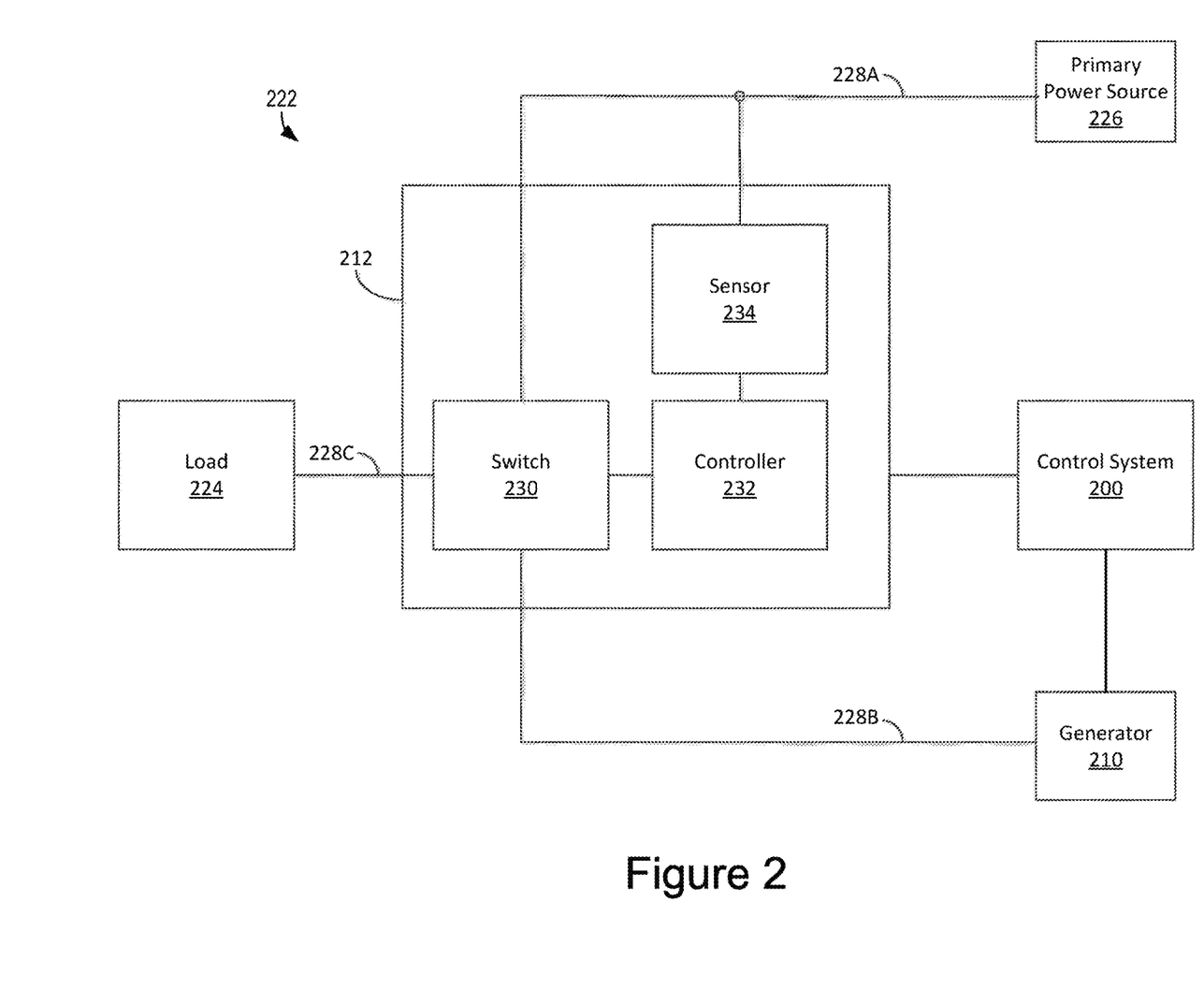
FIG. 2 illustrates a simplified block diagram of a power distribution system according to an example embodiment.

Additionally, for example, if the conduit is cut and the conductors 116 are in an open circuit condition, the generator 110 cannot receive the start signal when the transfer switch 112 actuates the control relay 114. An example open circuit condition is shown in FIG. 2 by a "X" 120. Thus, because the control system 100 cannot detect the short circuit condition 118 and/or the open circuit condition 120 on the conductors 116 for transmitting start signal to the generator 110, the generator 110 may improperly start when it is not needed and/or the generator 110 may not start when it is needed. This problem may be compounded in scenarios in which the conductors 116 are in a conduit and, therefore, not readily visible for inspection.

The systems and methods of the present disclosure provide control systems and methods for controlling a generator and providing an alarm upon detection of a fault condition. In one example, a control system includes a control relay, which includes a normally-open (NO) contact pair and a normally-closed (NC) contact pair, between the transfer switch and a controller. The NO contact pair is provided by a NO contact and a common contact, and the NC contact pair is provided by a NC contact and the common contact. The controller can receive signals indicative of a state of the contact pairs of the control relay and, based on the signals, determine whether to activate the generator and/or activate an alarm system.

Within examples, the controller can determine that a first signal indicates that the NC contact is in a closed state when the first signal has a non-zero voltage and/or current, and an open state when the first signal has an approximately zero voltage and/or current. Similarly, the controller can determine that a second signal indicates that the NO contact is in a closed state when the second signal has a non-zero voltage and/or current, and an open state when the second signal has an approximately zero voltage and/or current.

In one implementation, when the controller determines that the first signal and the second signal are indicative of both contacts being in the same state (i.e., both contacts in the closed state or both contacts are in the open state), the controller can activate the alarm system to indicate that a fault condition of the control system has occurred. Whereas, when the controller determines that the first signal and the second signal indicate that the contacts are in different states, the controller (i) causes the generator to start or maintains the generator in an off state depending on an operative coupling of the transfer switch to the control relay (as described in further detail below with respect to FIGS. 4-5), and (ii) determines that no fault condition of the control system has occurred (i.e., the controller does not activate the alarm system).

FIG. 2 is a block diagram of a power distribution system 222 in which a control system 200 can be implemented according to an example embodiment of the present disclosure. As shown in FIG. 2, the power distribution system includes a transfer switch 212. The transfer switch 212 selectively couples a load 224 to either a primary power source 226 or a generator 210. In an example, the primary power source 226 can be provided by a power utility (e.g., via the electric grid), a battery, and/or a renewable energy power generation system (e.g., a wind power system, a hydro-electric power generation system, a solar power generation system, etc.). The generator 210 can be, for example, a diesel generator, a natural gas generator, a propane fuel generator, a renewable energy power generator. Additionally, within examples, the generator 210 can be a portable generator and/or a fixed installation generator.

As shown in FIG. 2, the primary power source 226 is coupled to the transfer switch 212 via a primary conductor 228A, the generator 210 is coupled to the transfer switch 212 via a secondary conductor 228B, and the transfer switch 212 is coupled to the load 224 via an output conductor 228C. In general, the primary power source 226 and the generator 210 can provide electric power in the form of an electric signal. In particular, for example, the electric signal can be an alternating current (AC) voltage signal.

While the primary power source 226, the generator 210, the conductors 228A-228C, and the load 224 are shown as a single-phase system in FIG. 2, other configurations can be utilized in other examples. For instance, the primary power source 226, the generator 210, the conductors 228A-228C, and/or the load 224 can be configured as a three-phase or another poly-phase system in other examples. In a single-phase system, the conductors 228A-228C carry a single electric signal. In a three-phase system, three conductors 228A-228C may each include multiple conductors to facilitate carrying three separate electric signals of the same frequency at different phases.

As also shown in FIG. 2, the transfer switch 212 includes a switch 230, which selectively connects the primary source 226 or the generator 210 to the load 224. The switch 230 can thus include one or more electromechanical contactors, solid state devices, circuit breaker devices, and/or other suitable devices for electric power transfer. In one example, the switch 230 includes a solenoid that activates an electrical contact to move between a connection to the primary conductor 228A and a connection to the secondary conductor 228B. Other examples are also possible.

In practice, the switch 230 can be operably switched between multiple states. In a first state, the switch 230 can connect the primary power source 226 to the load 224. In a second state, the switch 230 can connect the generator 210 to the load 224. The switch 230 is selectively switched between the first state and the second state under control of a switch controller 232.

The switch controller 232 may thus provide control signals to the switch 230, which selectively control the state of the switch 230 to connect either the primary power source 226 or the generator 210 to the load 224. In some examples, the switch controller 232 controls the switch 230 based on an analysis of the electric signal transmitted on the primary conductor 228A from the primary power source 226 to the load 224. In particular, the switch controller 232 can monitor the electric signal on the primary conductor 228A for certain conditions, which indicate that it may be beneficial to switch the load 224 from the primary power source 226 to the generator 210 (e.g., an outage of the primary source 226 has or is likely to occur).

In an example, to monitor the electric signal on the primary conductor 228A, the switch controller 232 is coupled to the primary conductor 228A via a sensor 234. The sensor 234 senses the electric signal transmitted on the primary conductor 228A and provides an indication of one or more parameters of the electric signal (e.g., a magnitude of current, voltage, power, etc.) to the switch controller 232. As one example, the sensor 234 can include a current transformer coupled to the primary conductor 228A. In such an example, as current flows through the primary conductor 228A, the current transformer induces a current in the sensor 234 that is proportional to the current flowing through the primary conductor 228A. The sensor 234 and/or the switch controller 232 may then determine from the induced current a voltage or current of the electric signal transmitted on the primary conductor 228A from the primary power source 226 to the load 224. Other examples are also possible.

The switch controller 232 can be, for example, a microcontroller, a microprocessor, an application specific integrated circuit (ASIC) device, field programmable gate array (FPGA), programmable logic controller (PLC) or the like. The switch controller 232 can include memory to store any data required by the switch controller 232 for detecting conditions of the primary power source 226, initiating a power transfer, or executing any other functionality. For example, the memory can store one or more application code (e.g., main functionality firmware), initialization parameters, boot code, code for executing algorithms, code for determining a low-power and/or instability condition, code for setting user defined thresholds for algorithms, check sums to determine whether code is corrupted, lock codes, and/or other data. This data can be stored in the memory at the factory, manually entered via an input/output device (not shown), or remotely downloaded via the input/output device. The memory can be integrated with the switch controller 232, or the memory can be external and remotely coupled to the switch controller 232. The memory can be, for example, random access memory (RAM), read only memory (ROM), electronic erasable programmable read only memory (EEPROM), flash memory, or other volatile or non-volatile memory (i.e., non-transitory computer readable media).

As noted above, the transfer switch 212 can detect one or more fault conditions and automatically transfer the load 224 between the primary power source 226 and the generator 210. Accordingly, the transfer switch 212 shown in FIG. 2 can be an automatic transfer switch. However, in additional or alternative examples, the transfer switch 212 can be a manual transfer switch such that manual operation of transfer switch 212 transfers the load 224 between the primary power source 226 and the generator 210.

In either case, to transfer power between the primary power source 226 and the generator 210, the transfer switch 212 can initiate a control sequence in which the transfer switch 212 starts the generator 210 so that the generator 210 can provide power to the load 224 upon the switch 230 switching from the first state to the second state. As shown in FIG. 2, the switch controller 232 is in communication with the control system 200, and the control system 200 is in communication with the generator 210. In this arrangement, when the switch controller 232 determines that the load 224 will be transferred from the primary power source 226 to the generator 210, the switch controller 232 can initiate a control sequence to cause the generator 210 to start.

Figure 3:
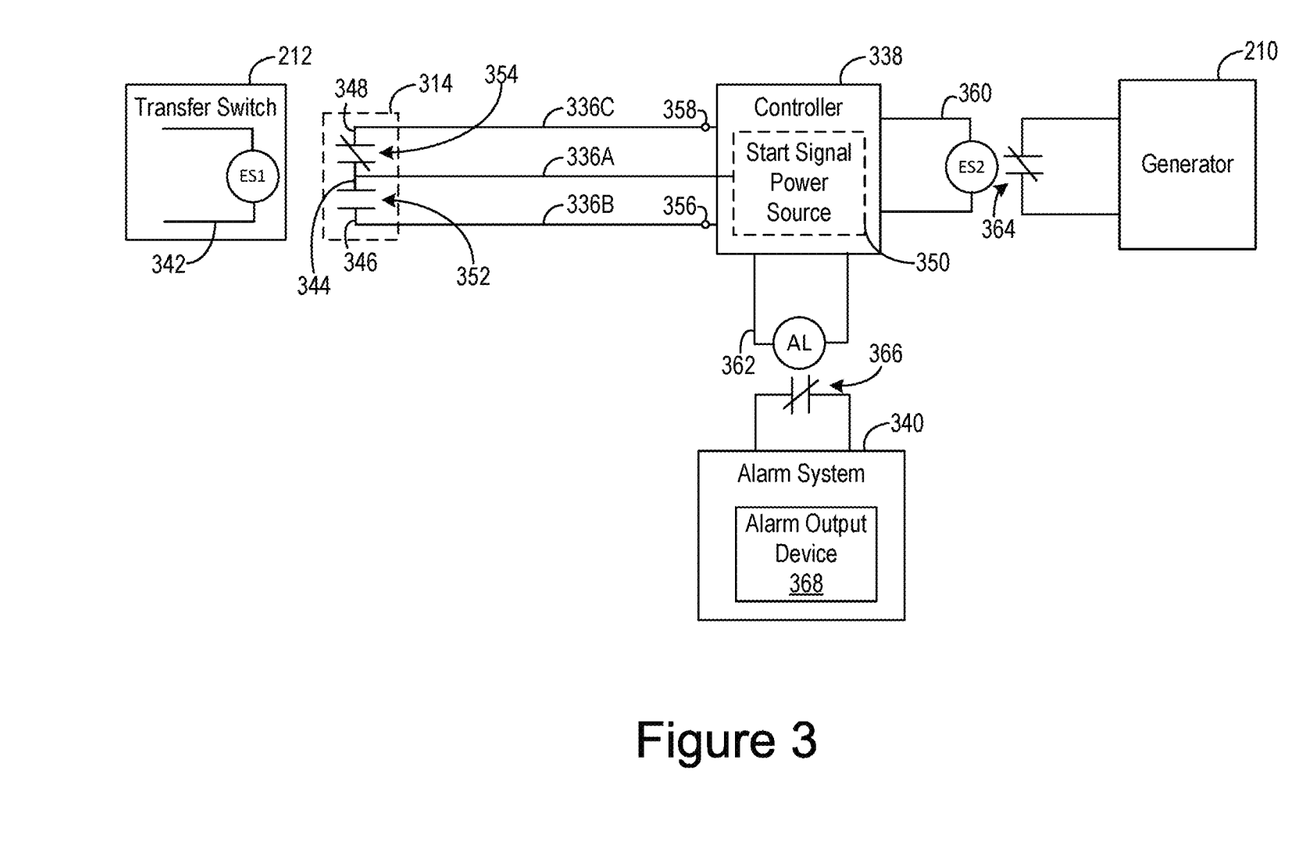
FIG. 3 illustrates a simplified block diagram of a control system according to an example embodiment.

The control system 200 can include one or more components for performing the control sequence. FIG. 3 depicts the control system 200 according to an example embodiment of the present disclosure. As shown in FIG. 3, the control system 200 includes the transfer switch 212, a control relay 314, a plurality of conductors 316A-316C, a controller 338, an alarm system 340, and the generator 210. The transfer switch 212 is operably coupled to the control relay 314. The control relay 314 is coupled, via the conductors 316A-316C, to the controller 338. The controller 338 is operably coupled to the alarm system 340. The controller 338 is also operably coupled to the generator 210.

In general, the transfer switch 212 is operable to actuate the control relay 314. In one example, when the transfer switch 212 receives power from the primary power source 226, the transfer switch 212 conducts an electric signal through the circuit 342 and the electric signal energizes the control relay 314. Whereas, when the transfer switch 212 does not receive power from the primary power source 226 (e.g., due to a power interruption), the transfer switch 212 may not conduct the electric signal through the circuit 342 and the control relay 314 is de-energized. In one implementation, for instance, the electric signal conducted through circuit 342 can include at a least a portion of the power conducted by the transfer switch 212 from the primary power source 226 to the load 224.

In FIG. 3, the control relay 314 is a Form C contact relay (also referred to as a "changeover relay"). As such, the control relay 314 can include a common contact 344, a normally-open (NO) contact 346, and a normally-closed (NC) contact 348. The common contact 344 is coupled, by a first conductor 316A, to a signal power source 350. The signal power source 350 can be a direct current (DC) power source and/or an AC power source. In FIG. 3, the signal power source 350 is located at the controller 338; however, the signal power source 350 can be located remotely relatively to the controller 338 in other examples.

As shown in FIG. 3, the common contact 344 and the NO contact 346 form a normally open contact pair 352, and the common contact 344 and the NC contact 348 form a normally closed contact pair 354. As noted above, the transfer switch 212 can selectively energize and de-energize the control relay 314 to actuate the control relay 314. Specifically, when the control relay 314 is energized by the transfer switch 212, the common contact 344 is electrically coupled to the NO contact 346 and electrically decoupled from the NC contact 348. Whereas, when the control relay 314 is de-energized, the common contact 344 is electrically coupled to the NC contact 348 and electrically decoupled from the NO contact 346. In this way, the transfer switch 212 can selectively energize the control relay 314 to selectively couple the common contact 344 to one of the NO contact 346 and the NC contact 348.

In this arrangement, each of the NO contact 346 and the NC contact 348 are in a respective state based on whether the control relay 314 is energized by the transfer switch 212. More particularly, the NO contact 346 is in a NO-closed state when coupled to the common contact 344, and a NO-open state when decoupled from the common contact 344. Similarly, the NC contact 348 is in a NC-closed state when coupled to the common contact 344 and an NC-open state when decoupled from the common contact 344. Accordingly, when the control relay 314 is energized by the transfer switch 212, the NO contact 346 is in the NO-closed state and the NC contact 348 is in the NC-open state. Whereas, when the control relay 314 is de-energized, the NC contact 348 is in the NC-closed state and the NO contact 346 is in the NO-open state.

The controller 338 includes a first input 356 coupled to the NO contact 346 by a second conductor 316B, and a second input 358 coupled to the NC contact 348 by a third conductor 316C. The first input 356 can receive a first signal from the second conductor 316B, and the second input 358 can receive a second signal from the third conductor 316C. The first signal can indicate the state of the NO contact 346, and the second signal can indicate the state of the NC contact 348. Specifically, the first signal can indicate whether the NO contact 346 is in the NO-closed state or the NO-open state, and the second signal can indicate whether the NC contact 348 is in the NC-closed state or the NC-closed state.

For example, when NO contact 346 is in the NO-closed state and no fault condition exists on the conductors 316A-316C, the NO contact 346 is coupled to the common contact 344. In this scenario, the start signal power source 350 thus provides power to the first input 356 via the first conductor 316A, the common contact 344, the NO contact 346, and the second conductor 316B. Whereas, when the NO contact 346 is in the NO-open state, the NO contact 346 is decoupled from the common contact 344 and, thus, no power is provided to the first input 356.

Accordingly, to determine the state of the NO contact 346 indicated by the first signal, the controller 338 can (i) determine an electrical parameter (e.g., a voltage, a current, and/or a power) of the first signal at the first input 356, (ii) perform a comparison of the determined electrical parameter to a threshold value, (iii) determine, based on the comparison, that the first signal indicates that the NO contact 346 is in the NO-closed state if the electrical parameter is greater than the threshold value, and (iv) determine, based on the comparison, that the first signal indicates that the NO contact 346 is in the NO-open state if the electrical parameter is less than the threshold value.

The controller 338 can evaluate the second signal in a similar manner. For example, when NC contact 348 is in the NC-closed state and no fault condition exists on the conductors 316A-316C, the NC contact 348 is coupled to the common contact 344. In this scenario, the start signal power source 350 thus provides power to the second input 358 via the first conductor 316A, the common contact 344, the NC contact 348, and the third conductor 316C. Whereas, when the NC contact 348 is in the NC-open state, the NC contact 348 is decoupled from the common contact 344 and, thus, no power is provided to the second input 358.

Accordingly, to determine the state of the NC contact 348 indicated by the second signal, the controller 338 can (i) determine an electrical parameter (e.g., a voltage, a current, and/or a power) of the second signal at the second input 358, (ii) perform a comparison of the determined electrical parameter to the threshold value, (iii) determine, based on the comparison, that the second signal indicates that the NC contact 348 is in the NC-closed state if the electrical parameter is greater than the threshold value, and (iv) determine, based on the comparison, that the second signal indicates that the NC contact 348 is in the NC-open state if the electrical parameter is less than the threshold value.

In an example, the threshold value can be a nominal value such as, for instance, approximately zero current, voltage, and/or power. In such example, the controller 338 can determine that the first signal indicates that the NO contact 346 is in the NO-closed state when the first signal has a non-zero value electrical parameter, and the NO-open state when the first signal has an approximately zero value electrical parameter. Similarly, the controller 338 can determine that the second signal indicates that the NC contact 348 is in the NC-closed state when the second signal has a non-zero value electrical parameter, and the NC-open state when the second signal has an approximately zero value electrical parameter. The threshold value can be a value greater than approximately zero in other examples.

Figure 4:
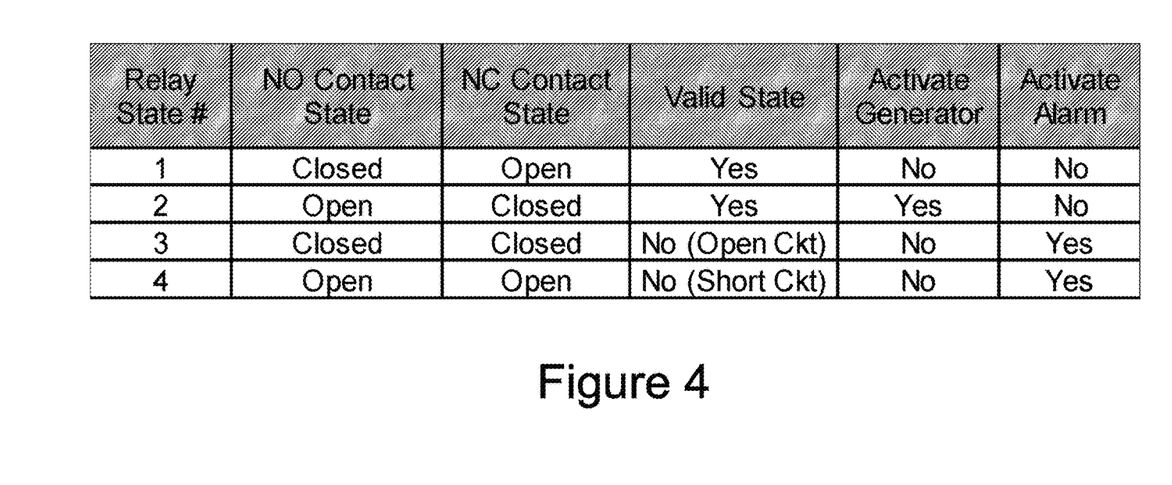
FIG. 4 illustrates a simplified block diagram of a control system according to an example embodiment.

Based on the first signal and the second signal, controller 338 can determine whether to activate the generator 210 and/or activate the alarm system 340. FIG. 4 depicts a table showing logic that can be implemented by the controller 338 to determine, based on the first signal and the second signal, whether to activate the generator 210 and/or activate the alarm system 340 according to one example embodiment. As shown in FIG. 4, at a given time, the controller 338 can determine that the control relay 338 is in one of four possible relay states based on the first signal and the second signal. Each relay state determinable by the controller 338 corresponds to a respective one of the following four scenarios.

In a first scenario, the transfer switch 212 energizes the control relay 314 and no fault condition exists on the conductors 316A-316C. While the transfer switch 212 energizes the control relay 314, the NO contact 346 is in the NO-closed state and the NC contact 348 is in the NC-open state. Because no fault condition exists, the start signal power source 350 provides power to the first input 356 via the coupling of the first conductor 316A, the common contact 344, the NO contact 346, and the second conductor 316B. As the NC contact 348 is decoupled from the common contact 344, no power is provided to the second input 358.

Thus, in the first scenario, the states of the NO contact 346 and the NC contact 348 indicated by the first signal and the second signal accurately correspond to the actual states of the NO contact 346 and the NC contact 348. As shown in FIG. 4, responsive to the controller 338 determining that the NO contact 346 is in the NO-closed state and the NC contact 348 is in the NC-open state, the controller 338 does not activate (i.e., maintains the deactivation) the generator 210 and the alarm system 340.

In a second scenario, the transfer switch 212 de-energizes the control relay 314 and no fault condition exists on the conductors 316A-316C. While the transfer switch 212 de-energizes the control relay 314, the NO contact 346 is in the NO-open state and the NC contact 348 is in the NC-closed state. Because no fault condition exists, the start signal power source 350 provides power to the second input 358 via the coupling of the first conductor 316A, the common contact 344, the NC contact 348, and the third conductor 316C. As the NO contact 346 is decoupled from the common contact 344, no power is provided to the first input 356.

Thus, in the second scenario, the states of the NO contact 346 and the NC contact 348 indicated by the first signal and the second signal accurately correspond to the actual states of the NO contact 346 and the NC contact 348. As shown in FIG. 4, responsive to the controller 338 determining that the NO contact 346 is in the NO-open state and the NC contact 348 is in the NC-closed state, the controller 338 activates the generator 210 and does not activate (i.e., maintains the deactivation) the alarm system 340.

In a third scenario, when a short circuit condition exists on the conductors 316A-316C, the power provided by the start signal power source 350 is conducted to both the first input 356 and the second input 358 due to the shorting of the conductors 316A-316. This occurs regardless of whether the transfer switch 212 energizes or de-energizes the control relay 314. As such, when a short circuit fault condition occurs, the first signal indicates that the NO contact 346 is in the NO-closed state and the second signal indicates that the NC contact 348 is in the NC-closed state. Thus, in the third scenario, one of the states of the NO contact 346 and the NC contact 348 indicated by the first signal and the second signal does not accurately correspond to the actual states of the NO contact 346 and the NC contact 348. As shown in FIG. 4, responsive to the controller 338 determining that the NO contact 346 is in the NO-closed state and the NC contact 348 is in the NC-closed state, the controller 338 activates the alarm system 340 and does not activate (i.e., maintains the deactivation) the generator 210.

In a fourth scenario, when an open circuit condition exists on the conductors 316A-316C, the power provided by the start signal power source 350 is not conducted to either the first input 356 or the second input 358 due to the open circuit condition. This result occurs regardless of whether the transfer switch 212 energizes or de-energizes the control relay 314. As such, when the short circuit condition occurs, the first signal indicates that the NO contact 346 is in the NO-open state and the second signal indicates that the NC contact 348 is in the NC-open state. Thus, in the third scenario, one of the states of the NO contact 346 and the NC contact 348 indicated by the first signal and the second signal does not accurately correspond to the actual states of the NO contact 346 and the NC contact 348. As shown in FIG. 4, responsive to the controller 338 determining that the NO contact 346 is in the NO-open state and the NC contact 348 is in the NC-open state, the controller 338 activates the alarm system 340 and does not activate (i.e., maintains the deactivation) the generator 210.

As described above, the controller 338 can activate and/or maintain deactivation of the generator 210 and/or the alarm system 340. In the example shown in FIG. 3, the controller 338 includes a first output 360 operatively coupled to the generator 210 and a second output 362 operatively coupled to the alarm system 340. In this example, the controller 338 can provide a signal at the first output 360, which energizes a first normally closed relay 364 of the generator 210. While the controller 338 provides the signal at the first output 360, the first normally closed relay 364 remains in an open state so that a start signal is not provided to the generator 210. Whereas, when the controller 338 ceases to provide the signal at the first output 360, the first normally closed relay 364 actuates to the closed state and provides the start signal to the generator 210. Responsive to the start signal, the generator 210 starts up and begins generating power.

Similarly, in FIG. 3, the controller 338 can provide a signal at the second output 362, which energizes a second normally closed relay 366 of the alarm system 340. While the controller 338 provides the signal at the second output 362, the second normally closed relay 366 remains in an open state so that an alarm signal is not provided to the alarm system 340. Whereas, when the controller 338 ceases to provide the signal at the second output 362, the second normally closed relay 366 actuates to the closed state and provides the alarm signal to the alarm system 340. Responsive to the alarm signal, the alarm system 340 can actuate an alarm output device 368 to generate an auditory alarm and/or a visual alarm.

As examples, the alarm output device 368 can include one or more audio speakers, lights, and/or video displays. More generally, the alarm output device 368 can include any device that can alert personnel to the occurrence of a fault condition (e.g., an open circuit fault and/or a short circuit fault on the conductors 316A-316C). In additional or alternative examples, the alarm output device 368 can also provide information relating to the fault condition (e.g., whether the fault condition is an open circuit condition or a short circuit condition).

The controller 338 can be, for example, a microcontroller, a microprocessor, an application specific integrated circuit (ASIC) device, field programmable gate array (FPGA), programmable logic controller (PLC) or the like. In FIG. 3, the controller 338 can include and/or be coupled to a memory. The memory can store any data required by the controller 338 for determining the states indicated by the first signal and the second signal, determining whether to activate the generator 210, determine whether to activate the alarm system 340, and/or executing any other functionality. For example, the memory can store one or more threshold values, application code (e.g., main functionality firmware), initialization parameters, boot code, code for executing algorithms, code for determining a low-power and/or instability condition, code for setting user defined thresholds for algorithms, check sums to determine whether code is corrupted, lock codes, and/or other data. This data can be stored in the memory at the factory, manually entered via an input/output device (not shown), or remotely downloaded via the input/output device. The memory can be integrated with the controller, or the memory can be external and remotely coupled to the controller 338. The memory can be, for example, random access memory (RAM), read only memory (ROM), electronic erasable programmable read only memory (EEPROM), flash memory, or other volatile or non-volatile memory (i.e., non-transitory computer readable media).

Figure 5:
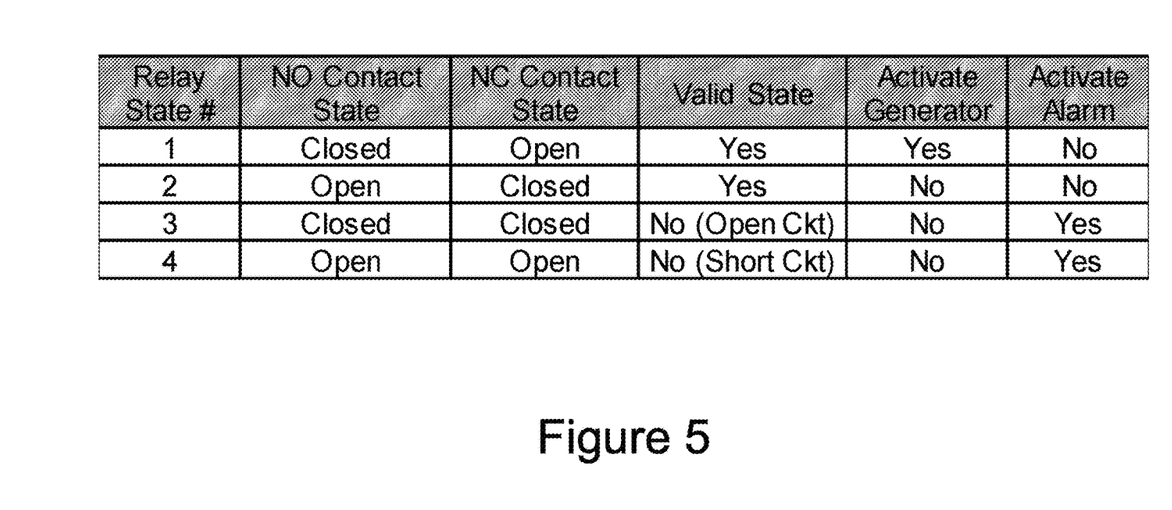
FIG. 5 illustrates a logic table according to an example embodiment.

In the example shown in FIG. 4, the controller 338 activates the generator 210 responsive to the first signal indicating the NO contact 346 is in the NO-open state and the second signal indicating that the NC contact 348 is in the NC-closed state. The example of FIG. 4 can thus provide for an implementation in which the transfer switch 212 de-energizes the control relay 316 to initiate a control sequence for starting the generator 210. In an alternative example, the transfer switch 212 can energize the control relay 316 to initiate the control sequence for starting the generator 210. FIG. 5 depicts a table showing logic that can be implemented by the controller 338 to determine, based on the first signal and the second signal, whether to activate the generator 210 and/or activate the alarm system 340 according to this alternative example.

Additionally, although the control system 200 includes one control relay 314, the control system 200 can include more than one control relay 314 in alternative examples. In an implementation of such alternative examples, the NO contacts 346 of each control relay 314 can be coupled in parallel to each other, and the NC contacts 348 of each control relay 314 can be coupled in series to each other.

Additionally, in the example described above with respect to FIG. 4, the short circuit condition and/or the open circuit condition can exist across one or more of the conductors 316A-316C. When the short circuit condition and/or the open circuit condition exists across all of the conductors 316A-316C, the controller 338 can immediately detect the fault condition and generate the alarm. Whereas, when the short circuit condition and/or the open circuit condition exists across less than all of the conductors 316A-316C, the controller 338 may immediately detect the fault condition or the controller 338 may detect the fault condition when the transfer switch 212 next actuates the control relay 314.

Figure 6:
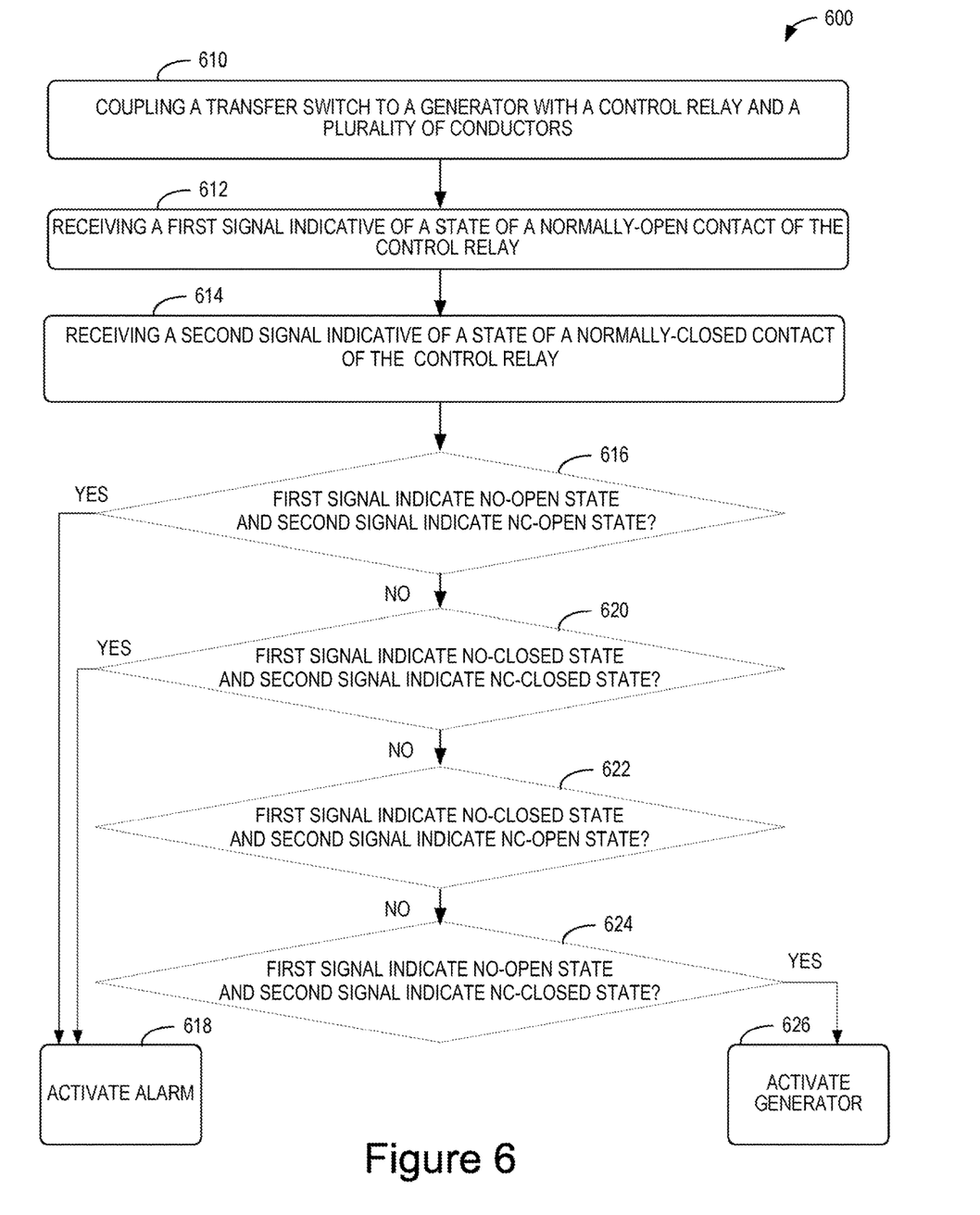
FIG. 6 illustrates a logic table according to an example embodiment.

Referring now to FIG. 6, a flowchart for a process 600 for controlling a generator is illustrated according to an example embodiment. As shown in FIG. 6, at block 610, the process 600 includes coupling a transfer switch to a generator with a control relay and a plurality of conductors. The control relay includes a common contact, a NO contact, and a NC contact. The common contact can receive power from an electrical power source. The NO contact is in a NO-closed state when coupled to the common contact and an NO-open state when decoupled from the common contact. The NC contact is in a NC-closed state when coupled to the common contact and an NC-open state when decoupled from the common contact. Additionally, the control relay can be configured such that (i) when the control relay is energized by a transfer switch, the NO contact is in the NO-closed state and the NC contact is in the NC-open state, and (ii) when the control relay is de-energized, the NC contact is in the NC-closed state and the NO contact is in the NO-open state.

At block 612, the process 600 can include receiving, at a controller, a first signal indicative of a state of the NO contact. At block 614, the process 600 can include receiving, at the controller, a second signal indicative of a state of the NC contact. At block 616, the process 600 can include determining, by the controller, whether the first signal is indicative of the NO-open state and the second signal is indicative of the NC-open state. If the controller determines that the first signal is indicative of the NO-open state and the second signal is indicative of the NC-open state at block 616, the controller can activate the alarm at block 618. Otherwise, if the controller determines that the either the first signal is not indicative of the NO-open state or the second signal is not indicative of the NC-open state, the process 600 can proceed to block 620.

At block 620, the process 600 can include determining, by the controller, whether the first signal is indicative of the NO-closed state and the second signal is indicative of the NC-closed state. If the controller determines that the first signal is indicative of the NO-closed state and the second signal is indicative of the NC-closed state at block 620, the controller can activate the alarm at block 618. Otherwise, if the controller determines that the either the first signal is not indicative of the NO-closed state or the second signal is not indicative of the NC-closed state, the process 600 can proceed to block 622.

At block 622, the process 600 can include determining, by the controller, whether the first signal is indicative of the NO-closed state and the second signal is indicative of the NC-open state. If the controller determines that the first signal is indicative of the NO-closed state and the second signal is indicative of the NC-open state at block 622, the controller can maintain the deactivation of the alarm and a generator. Otherwise, if the controller determines that the either the first signal is not indicative of the NO-closed state or the second signal is not indicative of the NC-open state, the process 600 can proceed to block 624.

At block 624, the process 600 can include determining, by the controller, whether the first signal is indicative of the NO-open state and the second signal is indicative of the NC-closed state. If the controller determines that the first signal is indicative of the NO-open state and the second signal is indicative of the NC-closed state at block 624, the controller can activate the generator at block 626.

Figure 7:
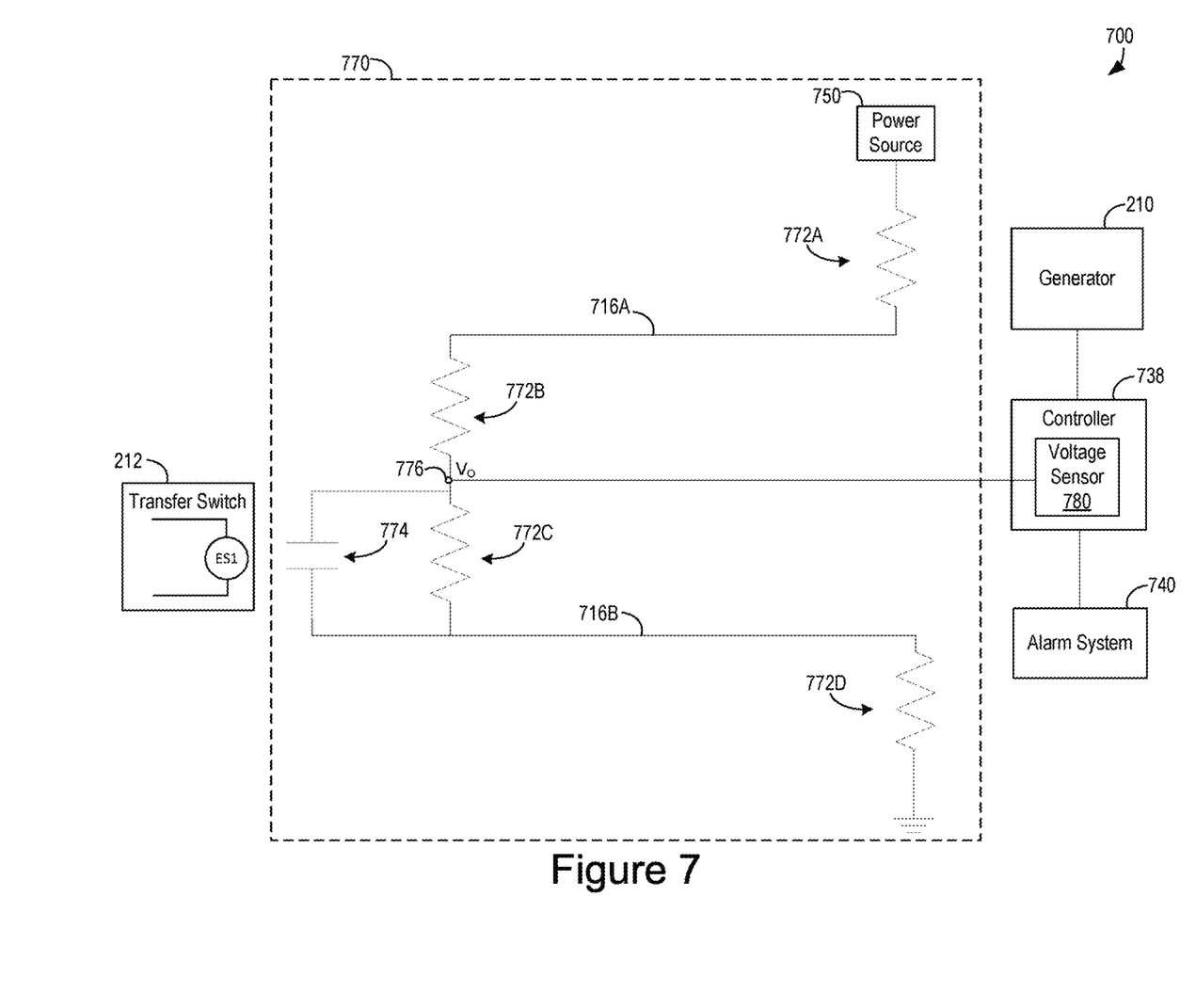
FIG. 7 illustrates a simplified block diagram of a control system according to an example embodiment.

Referring now to FIG. 7, a block diagram of a control system 700 is shown according to another example of the present application. As shown in FIG. 7, the control system 700 includes the transfer switch 212, a voltage divider circuit 770, a controller 738, a voltage sensor 780, the generator 210, and an alarm system 740.

The voltage divider circuit 770 includes a power source 750, a plurality of resistors 772A-772D, a relay 774, and a plurality of conductors 716A-716B. The power source 740 is coupled in series with the resistors 772A-772D. In one example, the power source 740 can be a DC power source. In FIG. 7, the resistors 772A-772D include a first resistor 772A, a second resistor 772B, a third resistor 772C, and a fourth resistor 772D. The first resistor 772A and the fourth resistor 772D are located at the generator 210, whereas the second resistor 772B and the third resistor 772C are located at the transfer switch 212. A first conductor 716A extends between the first resistor 772A at the generator 210 and the second resistor 772B at the transfer switch 212. A second conductor 716B extends between the third resistor 772C at the transfer switch 212 and the fourth resistor 772D at the generator 210.

The relay 774 is coupled in parallel with at least one of the resistors 772B-772C. For instance, in FIG. 7, the relay 774 is coupled in parallel with the third resistor 772C. The transfer switch 212 can actuate the relay 774 between a closed state and an open state. For instance, as described above, the transfer switch 212 can energize and de-energize the relay 774 to actuate the relay 774 between the closed state and the open state, respectively. In FIG. 7, the relay 774 is a normally open relay. As such, the relay 774 is in the closed state when the transfer switch 212 energizes the relay 774, and the relay is in the open state when the transfer switch 212 de-energizes the relay 774. However, the relay 774 can additionally or alternatively include a normally closed relay in other examples.

As shown in FIG. 7, the power source 750 and the resistors 772A-772D are arranged as a voltage divider circuit, which provides an output voltage, Vo, at a node 776 between the second resistor 772B and the third resistor 772C at the transfer switch 212. The output voltage, Vo, at the node 776 is equal to the voltage of the power source 750 multiplied by the ratio of (i) the sum of the impedances of the resistors 772A-772B between the power source 750 and the relay 774 to (ii) the total impedance of the voltage divider circuit 770.

The total impedance of the voltage divider circuit 770 varies based on the state of the relay 774. For example, when the relay 774 is in the open state, the total impedance of the voltage divider circuit 770 is the sum of the impedances of all of the resistors 772A-772D. Whereas, when the relay 774 is in the closed state, the total impedance of the voltage divider circuit 770 is reduced by the impedance of the third resistor 772C, which is in parallel with the relay 774. Accordingly, the output voltage, Vo, at the node 776 has a first threshold value when the relay 774 is in the closed state and a second threshold value when the relay 774 is in the open state. The second threshold value is greater than the first threshold value.

However, if a fault condition exists on the first conductor 716A and/or the second conductor 716B, the output voltage, Vo, at the output node 776 will be less than the first threshold value or greater than the second threshold value. Accordingly, the output voltage, Vo, at the node 776 can provide an indication of whether a fault condition exists on the conductors 716A-716B extending between the transfer switch 212 and the generator 210.

As one example, the start signal power source 750 can provide 24 VDC, the first resistor 772A can have an impedance of 1 kΩ, the second resistor 772B can have an impedance of 1 kΩ, the third resistor 772C can have an impedance of 2 kΩ, and the fourth resistor 772D can have an impedance of 1 kΩ. In this example, when the relay 774 is in the open state, the output voltage at the output node 776 is 4.8 V. Whereas, when the relay 774 is in the closed state, the output voltage at the output node 776 is 8 V. Further, when the relay 774 is in either the closed state or the open state, the output voltage may be less than 4.8 V or greater than 8 V when a fault condition exists on the conductors 716A-716B (or other components of the voltage divider circuit 770).

As shown in FIG. 7, the voltage sensor 780 is operatively coupled to the node 776 of the voltage divider circuit 770. In this way, the voltage sensor 780 can determine the output voltage, Vo, at the node 776. Based on the output voltage, Vo, determined by the voltage sensor 780, the controller 738 can determine whether to activate the generator 210 and/or whether to activate the alarm system 740. For example, when the controller 738 determines that the output voltage is equal to the second threshold value, controller 738 does not activate (i.e., maintains the deactivation) the generator 210 and the alarm system 740. When the controller 738 determines that the output voltage is between the second threshold value and the first threshold value, controller 738 activates the generator 210 and does not activate (i.e., maintains the deactivation) the alarm system 740. When the controller 738 determines that the output voltage is less than the first threshold value or greater than the second threshold value, the controller 738 activates the alarm system 740 (e.g., by generating an audible and/or visual alarm as described above).

In an example, the controller 738 can be a limit detector and/or any type of controller described above with respect to the controller 338. Also, within examples, the control system 700 can include one or more shielded cables and/or grounding devices to reduce or mitigate electromagnetic interference.

Figure 8:
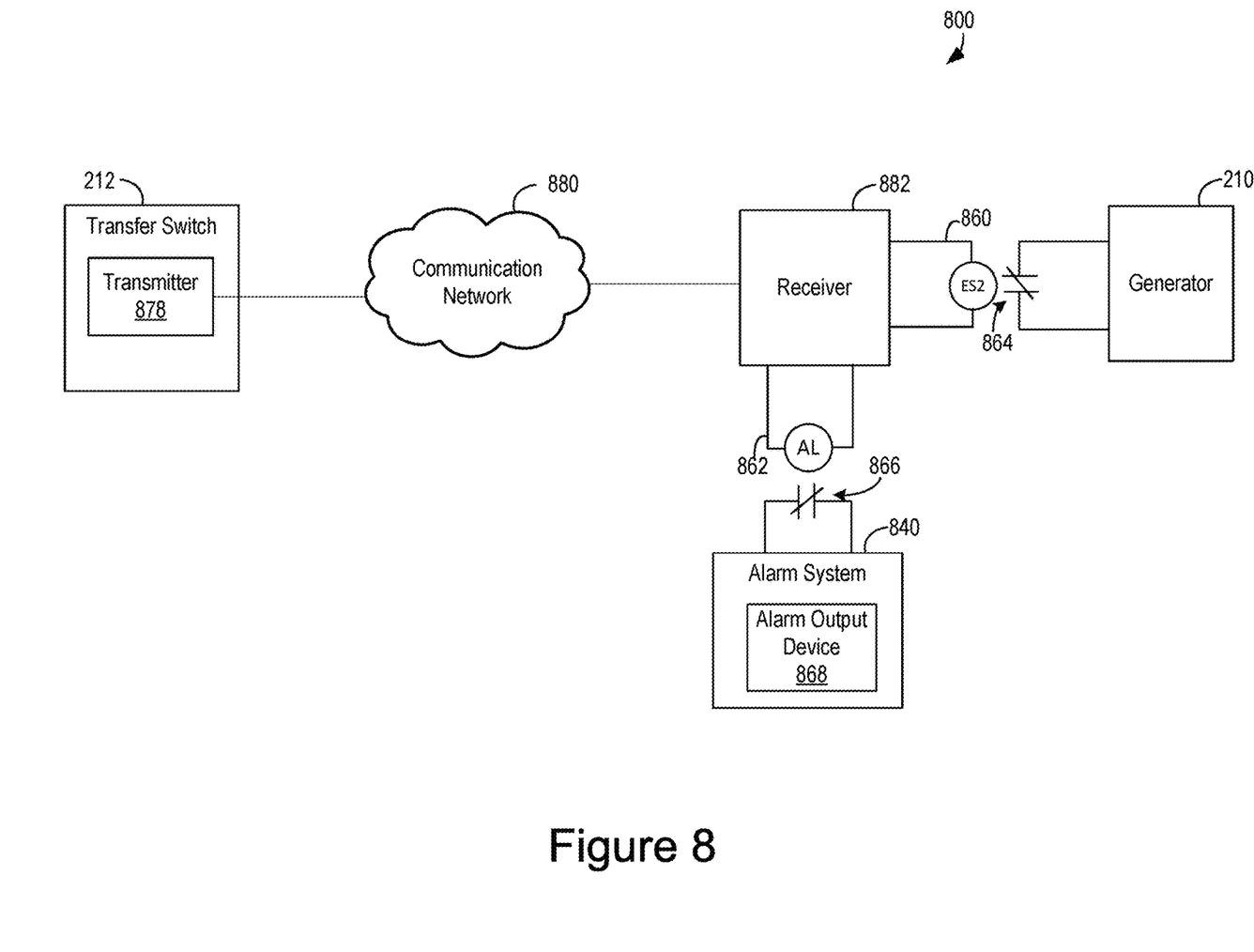
FIG. 8 illustrates a simplified block diagram of a control system according to an example embodiment.

Referring now to FIG. 8, a block diagram of a control system 800 is depicted according to another example of the present disclosure. As shown in FIG. 8, the control system 800 includes the transfer switch 212, a transmitter 878, a communication network 880, a receiver 882, the generator 210, and an alarm system 840.

The transmitter 878 can communicate with the receiver 882 over the communications network 880. Within examples, the communication network 880 is a digital communication network such as, for instance, a control area network (CAN) or a Transmission Protocol/Internet (TCP/IP) network. The communication network 880 can thus provide a digital communications link between the transfer switch 212 and the generator 210. In general, the transfer switch 212 can use the transmitter 878 to transmit, via the digital communications link, a trigger signal and/or a status signal to the receiver 882 at the generator 210.

In FIG. 8, the transfer switch 212 includes the transmitter 878; however, the transmitter 878 can be separate from the transfer switch 212 in other examples. Similarly, the generator 210 is coupled to the receiver 882 in FIG. 8; however, the generator 210 can include the receiver 882 in other examples. Although FIG. 8 depicts the control system 800 as including one transfer switch 212 with one transmitter 878 and one generator 210 with one receiver 880, the control system 800 can include a plurality of transfer switches 212, which each have a respective transmitter 878, and a plurality of generators 210, which each have a respective receiver 882, in other examples.

As shown in FIG. 8, the receiver 882 includes a first output 860 operatively coupled to the generator 210, and a second output 862 operatively coupled to the alarm system 840. In this example, the controller 882 can provide a signal at the first output 860, which energizes a first normally closed relay 864 of the generator 210. While the receiver 882 provides the signal at the first output 860, the first normally closed relay 864 remains in an open state so that a start signal is not provided to the generator 210. Whereas, when the receiver 882 ceases to provide the signal at the first output 860, the first normally closed relay 864 actuates to the closed state to provide a start signal to the generator 210. Responsive to the start signal, the generator 210 starts up and begins generating power.

Accordingly, to start the generator 210, the transfer switch 212 can cause the transfer switch 878 to transmit the trigger signal to the receiver 882 via the digital communication link provided by the communication network 880. Responsive to receiving the trigger signal, the receiver 882 can cease to provide the signal at the first output 860. In response, the normally closed relay 864 closes and provides the start signal to the generator 210. Responsive to the start signal, the generator 210 starts up and begins generating power. In one example, the generator 210 can start up between approximately 0.2 seconds and approximately 0.5 seconds after the transfer switch 212 causes the transmitter 878 to transmit the trigger signal.

In FIG. 8, the receiver 882 can also provide a signal at the second output 862, which energizes a second normally closed relay 866 of the alarm system 840. While the receiver 882 provides the signal at the second output 862, the second normally closed relay 866 remains in an open state so that an alarm signal is not provided to the alarm system 840. Whereas, when the receiver 882 ceases to provide the signal at the second output 862, the second normally closed relay 866 actuates to the closed state and provides the alarm signal to the alarm system 840.

Responsive to the alarm signal, the alarm system 840 can actuate an alarm output device 868 to generate an auditory alarm and/or a visual alarm. As examples, the alarm output device 868 can include one or more audio speakers, lights, and/or video displays. More generally, the alarm output device 868 can include any device that can alert personnel to the occurrence of a fault condition. In additional or alternative examples, the alarm output device 868 can also provide information relating to the fault condition.

The receiver 882 can monitor the digital communications link between the receiver 882 and the transmitter 878, and activate the alarm system 840 when the receiver 882 determines that a loss of communication fault condition exists. The loss of communication fault condition can include, for instance, a loss of connectivity between the transmitter 878 and the receiver 882, a loss of power of the transmitter 878, and/or a loss of power of the receiver 882.

In an example, the transmitter 878 can periodically transmit a status signal to the receiver 882 over the communication network 880. If the receiver 882 does not receive the status signal after a predetermined amount of time, which is related to the periodicity of status signal transmission, the receiver 882 can determine that the loss of communication fault condition exists. Responsive to the receiver 882 determining that the loss of communication fault condition exists, the receiver 882 can cease to provide the signal on second output 862, which causes the second normally closed relay 866 to close and provide the alarm signal to the alarm system 840. In this way, the alarm system 840 is activated responsive to a loss of connectivity between the transmitter 878 and the receiver 882, a loss of power of the transmitter 878, and/or a loss of power of the receiver 882.

In some examples, the receiver 882 does not activate the generator 210 when the alarm system 840 is activated. In other examples, the receiver 882 also activates the generator 210 when the receiver 882 activates the alarm system 840. In one example, the receiver 882 can activate the alarm system 840 between approximately one second and approximately three seconds after determining that the status signal was not received within the predetermined period of time.

In the example described above, the transmitter 878 transmits the status signal to the receiver 882 on a periodic basis; however, the receiver 882 can additionally or alternatively request the transmitter 878 transmit the status signal on an aperiodic basis in other examples. For instance, the receiver 882 can transmit a status request signal to the transmitter 878 and, responsive to the status request signal, the transmitter 878 transmits the status signal to the receiver 882.

As noted above, although FIG. 8 depicts the control system 800 with one transmitter 878 and one receiver 882, the control system 800 can include a plurality of transmitters 878 and/or a plurality of receivers 882 in other examples. In such examples, each transmitter 878 and each receiver 882 can have a respective address. In some examples, the transmitters 878 can have respective addresses in a first range of addresses, and the receivers 882 can have addresses in a second range of addresses.

In one example, when each transmitter 878 and/or each receiver 882 is added to the control system 800, the transmitter 878 and/or the receiver 882 can automatically determine the respective address for the transmitter 878 and/or the receiver 882. For instance, when each transmitter 878 is added to the control system 800, the transmitter 878 can listen for a period of time (e.g., approximately 1-2 seconds) for the other transmitters 878 in the control system 800 and then select an address that is not being used by the other transmitters 878. If two or more transmitters 878 select the same address at the same time, then the two or more transmitters 878 can all select another random address. In one example, the control system 800 can include between 1 transmitter 878 and 240 transmitters 878 at one time.

Similarly, when each receiver 882 is added to the control system 800, the receiver 882 can listen for a period of time (e.g., approximately 1-2 seconds) for the other receivers 882 in the control system 800 and then select an address that is not being used by the other receivers 882. If two or more receivers 882 select the same address at the same time, then the two or more receivers 882 can all select another random address. In one example, the control system 800 can include between one receiver 882 and sixteen transmitters 882 at one time.

As described above, the receiver(s) 882 can detect a loss of communication fault condition for each of the transmitter(s) 878. In one example, when each receiver 882 boots up, the receiver 882 determines the quantity and addresses of the transmitter(s) 878 in the control system 800 network. Once the receiver 882 determines the quantity and addresses of the transmitter(s) 878, the receiver 882 can monitor the status signals from the transmitter(s) 878 to determine when a loss of communication fault condition occurs, as described above.

In one implementation of the above example, the receiver 882 can activate the alarm system 840 while the receiver 882 performs the process for determining the quantity and addresses of the transmitter(s) 878, and the receiver 882 can deactivate the alarm system 840 after determining the quantity and addresses of the transmitter(s) 878. In an additional or alternative implementation, when another transmitter 878 is added to the control system 800, the receiver 882 can activate the alarm system 840 to prompt an operator to restart the boot up process. This can allow the receiver 882 to identify the added transmitter 878 and monitor the added transmitter 878 going forward.

Additionally or alternatively, the receiver 882 can include a user input (e.g., a pushbutton), which can be actuated to initiate the process for determining the quantity and addresses of the transmitter(s) 878.

In some examples, the receiver 878 can include an indicator light to provide a notification of the status of the receiver 878. For instance, in one implementation, the indicator light can flash while the receiver 878 performs the process for determining the quantity and addresses of the transmitter(s) 878. In one implementation, the indicator light can provide a steady illumination for a period to time (e.g., approximately 5 seconds) after the process is complete, and then the indicator light can flash one time, for a period of time (e.g., approximately 1 second) for each transmitter 878 identified by the receiver 882. After flashing one or more times to indicate the quantity of transmitter(s) 878, the receiver 882 can turn off. The indicator light can flash each time the receiver 882 receives a status signal. Also, for example, the indicator light can perform a fast flash (i.e., flash at a rapid speed than the other flashes described above) to indicate that an additional transmitter 878 has been added to the control system 800 network.

The transmitter(s) 878 and/or the receiver(s) 882 include, for example, a microcontroller, a microprocessor, an application specific integrated circuit (ASIC) device, field programmable gate array (FPGA), programmable logic controller (PLC) or the like, as described above with respect to the controller 338.

Any of the blocks shown in FIG. 6 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

The invention claimed is:

1. A method for controlling a generator by a transfer switch configured to select to couple a load to the generator instead of to a primary power source, comprising:
    determining a voltage at a node included in a voltage divider circuit, the node being in communication with the transfer switch and the generator;
    performing a comparison of the determined voltage to a first threshold value and a second threshold value;
    determining, based on the comparison, the occurrence of a fault condition, including determining that the determined voltage is less than the first threshold value or greater than the second threshold value, and wherein the first threshold value is indicative of a valid operational state in which the generator is to remain deactivated, wherein the second threshold value is indicative of a valid operational state in which the generator is to be activated; and
    responsive to determining that the determined voltage is less than the first threshold value or greater than the second threshold value, activating an alarm system;
    wherein the voltage divider circuit comprises a relay configured to be activated between closed and open states by the transfer switch, and wherein a total impedance of the voltage divider circuit varies with a state of the relay;
    wherein the voltage at the node of the voltage divider circuit equals the first threshold value when the relay is in the open state and equals the second threshold value when the relay is in the closed state.

2. The method of claim 1, wherein the alarm system is activated when the determined voltage is less than the first threshold value, and wherein the alarm system is activated when the determined voltage is greater than the second threshold value.

3. The method of claim 1, wherein activating the alarm system comprises generating at least one of an audible or a visual alarm and wherein determining the fault condition includes determining the occurrence of each of an open circuit and a short circuit.

4. A computer program product comprising a non-transitory computer-readable medium having computer-executable instructions stored thereon, which when executed by a processor, causes a system to perform the method according to claim 1.

5. A system for controlling a generator by a transfer switch, comprising:
    a controller including a memory and/or coupled to a memory, the memory having processor-executable instructions stored therein which when executed by a processor, causes the system to:
    determine a voltage at a node included in a voltage divider circuit, the node being in communication with the transfer switch and the generator;
    perform a comparison of the determined voltage to a first threshold value and a second threshold value;
    determine, based on the comparison, the occurrence of a fault, including determining that the determined voltage is less than the first threshold value or greater than the second threshold value, wherein the first threshold value is indicative of a valid operational state in which the generator is to remain deactivated, and wherein the second threshold value is indicative of a valid operational state in which the generator is to be activated; and
    responsive to determining that the determined voltage is less than the first threshold value or greater than the second threshold value, activate an alarm system;
    wherein the voltage divider circuit comprises a relay configured to be activated between closed and open states by the transfer switch, and wherein a total impedance of the voltage divider circuit varies with a state of the relay;
    wherein the voltage at the node of the voltage divider circuit equals the first threshold value when the relay is in the open state and equals the second threshold value when the relay is in the closed state.

6. The system of claim 5, wherein the controller comprises one of a micro-controller, a microprocessor, an application specific integrated circuit, a field programmable gate array or a programmable logic controller.

7. The system of claim 5, wherein the alarm system is activated when the determined voltage is less than the first threshold value, and wherein the alarm system is activated when the determined voltage is greater than the second threshold value.

8. The system of claim 5, further comprising the voltage divider circuit, wherein the voltage divider circuit comprises a voltage source, first, second, third and fourth resistors and first and second conductors.

9. The system of claim 5, further comprising a voltage sensor operatively coupled to the node of the voltage divider circuit to determine the voltage at the node.

10. The system of claim 5, further comprising the transfer switch and the generator.

11. The system of claim 8 wherein the node of the voltage divider circuit is located between the second and third resistors.

12. The system of claim 11, wherein the voltage divider circuit further comprises a relay, and wherein the relay is coupled in parallel between at least one of the second and third resistors.

13. The system of claim 12, wherein when the relay is in an open state, a total impedance of the voltage divider circuit is a sum of an impedance of the first, second, third and fourth resistors, and when the relay is in a closed state, the total impedance of the voltage divider circuit is reduced by an impedance of the third resistor.

14. The system of claim 8, wherein the first and fourth resistors are located at the generator and the second and third resistors are located at the transfer switch.

15. The system of claim 14, wherein the first conductor extends between the first resistor at the generator and the second resistor at the transfer switch, and the second conductor extends between the third resistor at the transfer switch and the fourth resistor at the generator.

16. A method for controlling a generator by a transfer switch, comprising:

determining a voltage at a node included in a voltage divider circuit, the node being in communication with the transfer switch and the generator;

performing a comparison of the determined voltage to a first threshold value and a second threshold value for determining the occurrence of a fault condition in one or more conductors coupled between the generator and the transfer switch, wherein the first threshold value is indicative of a valid operational state in which the generator is to remain deactivated, and wherein the second threshold value is indicative of a valid operational state in which the generator is to be activated; and determining, based on the comparison and the determining of the occurrence of the fault condition in one or more conductors coupled between the generator and the transfer switch, whether to activate the generator and/or whether to activate an alarm system, wherein the method is performed when the transfer switch is configured to select to couple a load to the generator instead of to a primary power source;

wherein the voltage divider circuit comprises a relay configured to be activated between closed and open states by the transfer switch, and wherein a total impedance of the voltage divider circuit varies with a state of the relay;

wherein the voltage at the node of the voltage divider circuit equals the first threshold value when the relay is in the open state and equals the second threshold value when the relay is in the closed state.

17. The method of claim 16, further comprising:

determining, based on the comparison, that the determined voltage is outside of a range between the first threshold value and the second threshold value; and responsive to determining that the determined voltage is outside of the range between the first threshold value and the second threshold value, activating an alarm system.

18. The method of claim 17, wherein the comparison provides an indication of whether a fault exists on conductors between the transfer switch and the generator.

* * * * *